Nov. 20, 1962  H. G. LIMMER  3,064,994
VEHICLE HAVING AIR SPRINGS CAPABLE OF LIFTING
THE INDIVIDUAL WHEELS OF THE VEHICLE
Filed Feb. 24, 1959
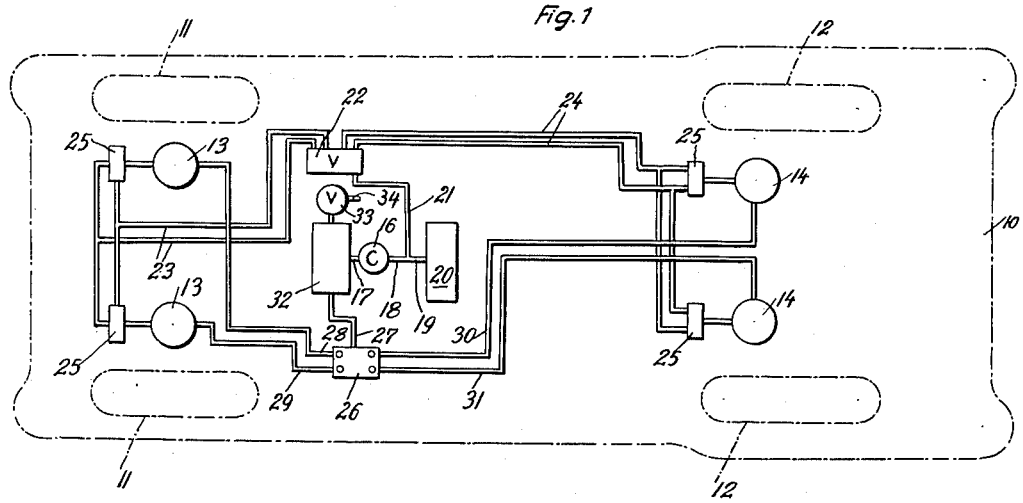
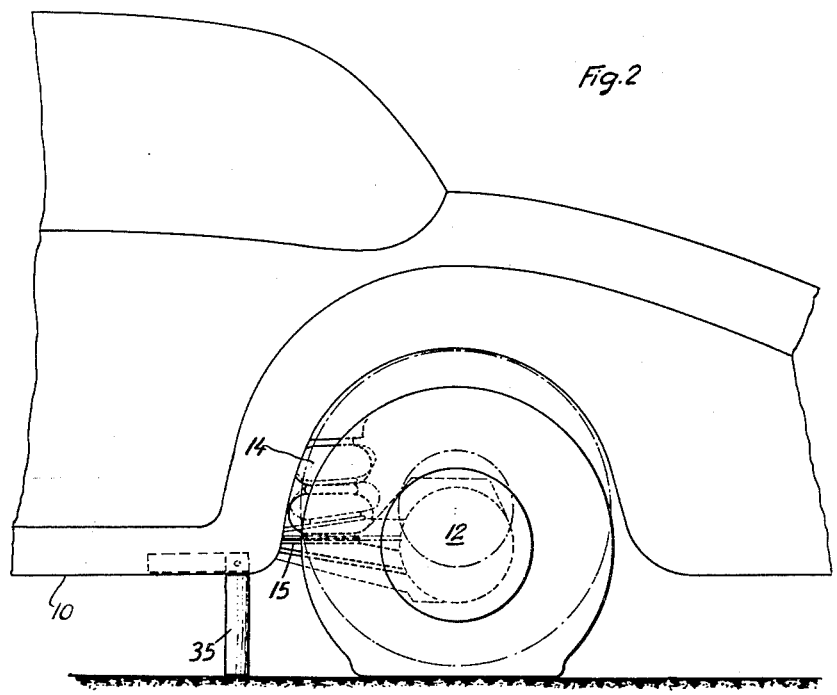
Inventor
HANS G. LIMMER
BY Dicke, Craig & Freudenberg
ATTORNEYS

United States Patent Office 3,064,994
Patented Nov. 20, 1962

3,064,994
VEHICLE HAVING AIR SPRINGS CAPABLE OF LIFTING THE INDIVIDUAL WHEELS OF THE VEHICLE
Hans G. Limmer, Waiblingen, Germany, assignor to Daimler-Benz Aktiengesellschaft, Stuttgart-Unterturkheim, Germany
Filed Feb. 24, 1959, Ser. No. 795,149
Claims priority, application Germany Feb. 26, 1958
11 Claims. (Cl. 280—124)

My invention relates to a vehicle having air springs, particularly to a motor vehicle.

It is the object of my invention to utilize the air springs and the control means associated therewith with a minimum of additional equipment for lifting any individual wheel of the vehicle, for instance for the purpose of exchanging a tire or a wheel, after the body of the vehicle has been propped up on the ground.

Further objects of my invention will appear from a detailed description of a preferred embodiment thereof described hereinafter with reference to the accompanying drawing. It is to be understood, however, that such detailed description serves the purpose of illustrating the invention rather than that of restricting or limiting it and that the terms and phrases used in such detailed description have been chosen for the purpose of explaining the invention rather than that of restricting or limiting same.

In the drawings

FIG. 1 is a diagrammatic representation of the air spring system of a passenger car equipped with my improved means for selectively lifting the wheels and FIG. 2 is a side view of the rear end of a motor car equipped with air springs and propped up preparatory to the lifting of the wheel by my improved equipment.

The passenger car illustrated in the drawings comprises a body 10 diagrammatically indicated in FIGS. 1 and 2 supported on a pair of front wheels 11 and a pair of rear wheels 12 by means of air springs 13 and 14 for up and down springing motion. The springs are individually co-ordinated to the wheels and are preferably interposed between the body and the wheel-carrying elements guided relative to the body for up and down motion. In the embodiment shown the rear wheels 12 are carried by half-axles (not shown), each half-axle being braced in the direction of travel by a link 15 having its front end pivotally connected to the body of the vehicle by a rubber joint and having its rear end connected to the half-axle, the air spring 14 being formed by a bellows resting on the link 15 and supporting the body 10. A system for producing compressed air is associated with the air springs. This system comprises an air compressor 16 adapted to be driven by the engine of the vehicle or by an electric motor and having an inlet 17 and an outlet 18, a pipe 19 connecting the outlet 18 with a reservoir 20 for compressed air, another pipe 21 connecting the outlet 18 and the inlet of the reservoir 20 with a distributer valve 22, a pair of pipes 23 connecting the distributer valve 22 with the air springs 13, another pair of pipes 24 connecting the distributer valve 22 with the air springs 14, and level regulating valves 25 inserted in the pairs of pipes 23 and 24.

For the purpose of selectively and individually lifting any wheel 11 or 12 together with the wheel guiding element connected therewith, such as the link towards the body, for instance for the purpose of the exchange thereof for a spare wheel, I have provided the additional equipment that will now be described.

A distributer valve 26 affording selective connection of a pipe 27 with any one of four pipes 28, 29, 30, and 31 is mounted on the body 10 for easy manual adjustment.

Each of the pipes 28—31 is connected with one of the bellows forming the air springs. The pipe 27 communicates with a tank 32 which also communicates with the intake 17 of the compressor 16 and may be connected by a valve 33 with an outlet 34 opening into the atmosphere. The valves 22 and 33 may be connected for joint adjustment.

In the normal operation of the system the compressor 16 sucks air from the atmosphere through the inlet 34, the valve 33, the tank 32, and the intake 17 and feeds the compressed air into the reservoir 20. The function of the distributor valve 22 supplied with compressed air from the reservoir 20 through the pipe 21 and the function of the level-regulating valves 25 need not be described as they are well-known in the art and do not form part of my invention.

When the driver wishes to lift one of the wheels of the vehicle, for instance the wheel 12 shown in FIG. 2, he will first prop up the body 10 near this wheel by means of a prop 35 which may be a block of wood or a brick. Preferably, however, the prop 35 is suitably secured to the body 10 by means (not shown) affording a possibility of lifting the prop into inoperative position such as illustrated by the dashed lines in FIGURE 2, and to lower it into operative position, when the necessity arises. For this purpose, there are preferably provided four props, each associated with one of the wheels. After the vehicle has been propped up, the driver will so adjust the distributer valve 26 as to connect the pipe 27 with that suction pipe 28, 29, 30 or 31 which leads to the wheel to be lifted. If the wheel to be lifted is that shown in FIG. 2, the valve 26 will be so adjusted as to connect the pipe 27 with the pipe 31. As a result, the compressed air entrapped in the air spring 14 will be exhausted through the pipe 31, the valve 26, the pipe 27, the tank 32, the valve 33, and the outlet 34 thereby relieving the wheel from the weight which theretofore was transferred by the bellows 14 to the link 15, the half-axle and the wheel 12 carried thereby. Thereafter the driver will so set the valves 22 and 33 connected for joint adjustment as to shut off the outlet 34 from the tank 32 and the pipe 21 from the pipes 23 and 24. Then he will start the compressor 16. This compressor will evacuate the tank 32 and suck air out of the bellows 14 shown in FIG. 2 via pipe 31, distributer valve 26 and pipes 27. In this manner a vacuum will be built up very shortly in the bellows 14 whereby the link 15 and the half-axle connected therewith and carrying the wheel 12 will be lifted and moved upwardly towards the body of the vehicle and will be kept in lifted position indicated by dash-dotted lines. In that position the wheel 12 may be easily exchanged. When that has been done the driver will restore the distributer valve 26 to its normal position in which the pipe 27 and each of the pipes 28–31 are closed. Moreover, he will restore valves 22 and 33 thereby connecting tank 32 to the atmosphere and connecting pipe 21 with the pipes 23 and 24. As a result, compressed air will flow from the reservoir 20 through the pipes 21 and 24 and through valve 25 into the bellows 14 shown in FIG. 2 thus lowering the wheel into its normal position in which it may properly support the body of the vehicle. As a result, the prop 35 will be relieved so that it may be taken away or may be swung into its inoperative position.

Preferably, the distributer valve 26 is so disposed as to be accessible to the driver of the vehicle only. Moreover, suitable means may be provided which will prevent distributer valve 26 from being set to an off-normal position unless the vehicle is at rest.

From the foregoing it will be appreciated that the essence of my invention is the provision of means for selectively sucking air out of any of the air springs associated to the wheels of the vehicle. The means for sucking the air out of the air springs and for producing a vacuum therein preferably comprises a system of conduits leading to each air spring and connected with a source of vacuum. This source may be the intake of the internal combustion engine or the intake of an air compressor which is provided for filling the air springs. Moreover, I have provided a distributor valve which when in off-normal position, may connect the air springs associated with the wheels of the vhicle selectively and individually with the source of vacuum, suitable means being provided for locking this distributer valve in normal position, when the vehicle is in motion.

According to another feature of my invention the wheel lifting operation may be expedited by temporarily establishing a communication between the air spring to be evacuated and the atmosphere, before vacuum is produced in the tank 32. A prop, such as 35, may be pivotally mounted on the chassis or the body at a point adjacent to the associated wheel and suitable means (not shown) may be provided which automatically lower the prop 35 into the position shown in FIG. 2 from its resting position, as indicated in dashed lines in FIGURE 2, when the distributing valve 26 is set to an off-normal position connecting the air spring of that particular wheel to the tank 32.

From the foregoing it will be seen that this invention is one well adapted to attain all of the ends and objects hereinabove set forth, together with other advantages which are obvious and which are inherent to the combination.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle having wheels, the combination comprising a spring suspension system consisting of air springs operatively connected to the wheels of the vehicle, conduits communicating with said air springs, a source of vacuum and valve means for selectively connecting said source with said conduits to withdraw air from said springs to lift said wheels and facilitate removal thereof.

2. The combination claimed in claim 1 in which said source of vacuum is an air pump.

3. In a vehicle having wheels and a body supported thereon, the combination comprising, a spring suspension system consisting solely of air springs associated with the wheels of said vehicle, an air pump having an inlet and an outlet, a first set of conduits connecting said outlet with said springs, a second set of conduits connecting said inlet with said springs and valve means coordinated to each of said sets of conduits for selectively supplying compressed air to said springs to maintain the pressure therein or selectively evacuating air from said air springs so that said air springs may be used to lift said wheels to facilitate removal thereof.

4. In a vehicle, the combination comprising a body, wheels, air springs for supporting said body on said wheels for up and down springing motion, a source of vacuum, conduits and valve means for selectively connecting said air springs to said source of vacuum, and liftable props individually coordinated to said wheels for supporting said body on the ground at points located adjacent to said wheels before the latter is lifted by evacuation of said air springs.

5. The combination claimed in claim 4 in which said conduits and said valve means are provided with an outlet for discharging air from said air springs prior to the connection thereof with said source of vacuum.

6. In a vehicle having a body and a plurality of wheels for supporting said body, the combination comprising, individual air springs coordinated to each of said wheels for up and down springing support of said body, a source of vacuum, conduit means interconnecting each of said air springs with said source of vacuum, a source of pressure, second conduit means interconnecting said air springs to said source of pressure, valve means in said second conduit means to control the supply of pressure to said air springs and thereby provide a desired riding characteristic, and second valve means in said conduit means for selectively controlling the connection of said source of vacuum to said individual air springs to selectively evacuate said air springs and lift the associated wheel to facilitate removal thereof.

7. In a vehicle, the combination as defined in claim 6, wherein said body is provided with a plurality of liftable props, one of which is attached to the body adjacent each wheel to provide a support for the body upon lifting of said adjacent wheel.

8. In a vehicle, the combination as defined in claim 6, wherein said air springs form a wheel suspension consisting solely of said air springs.

9. In a vehicle, the combination as defined in claim 8, wherein said source of vacuum and said source of pressure consist of a single air pump, the source of vacuum being the pump intake and the source of pressure being the pump exhaust.

10. In a vehicle having a plurality of wheels and a body; the combination comprising a spring suspension system comprising air springs operatively connected to the wheels of the vehicle for up and down springing support of said body and means communicating with said air springs effecting lifting of said wheels by evacuation of the air springs connected thereto below atmosphere pressure including an air pump, conduit means interconnecting said air pump and said air springs, and valve means arranged in said conduit means including means selectively connecting each air spring to be evacuated with said air pump to thereby effect evacuation thereof and lifting of the wheel connected thereto.

11. In a vehicle having a plurality of wheels and a body; the combination comprising a spring-suspension system comprising air springs operatively connected to the wheels of the vehicle for up and down springing support of said body and means communicating with said air springs effecting lifting of said wheels by evacuation of the air springs connected thereto including an air pump having an inlet providing a source of vacuum and an outlet providing a source of pressure, conduit means interconnecting said air pump and said air springs, said conduit means including means connecting said air springs to both said inlet and said outlet, and valve means arranged in said conduit means including means selectively connecting each air spring to be evacuated with the inlet of said air pump to thereby effect evacuation thereof and lifting of the wheel connected thereto and means for selectively controlling the supply of compressed air from said outlet to said air springs to maintain the pressure therein and provide a desired riding characteristic.

References Cited in the file of this patent

UNITED STATES PATENTS

| | | |
|---|---|---|
| 2,611,607 | Needy | Sept. 23, 1952 |
| 2,644,699 | Weiertz | July 7, 1953 |
| 2,705,870 | Holton | Apr. 12, 1955 |

FOREIGN PATENTS

| | | |
|---|---|---|
| 805,230 | Germany | May 10, 1951 |